Nov. 27, 1945.  W. H. PIKE  2,389,685
EMERGENCY GASOLINE TANK
Filed May 2, 1944
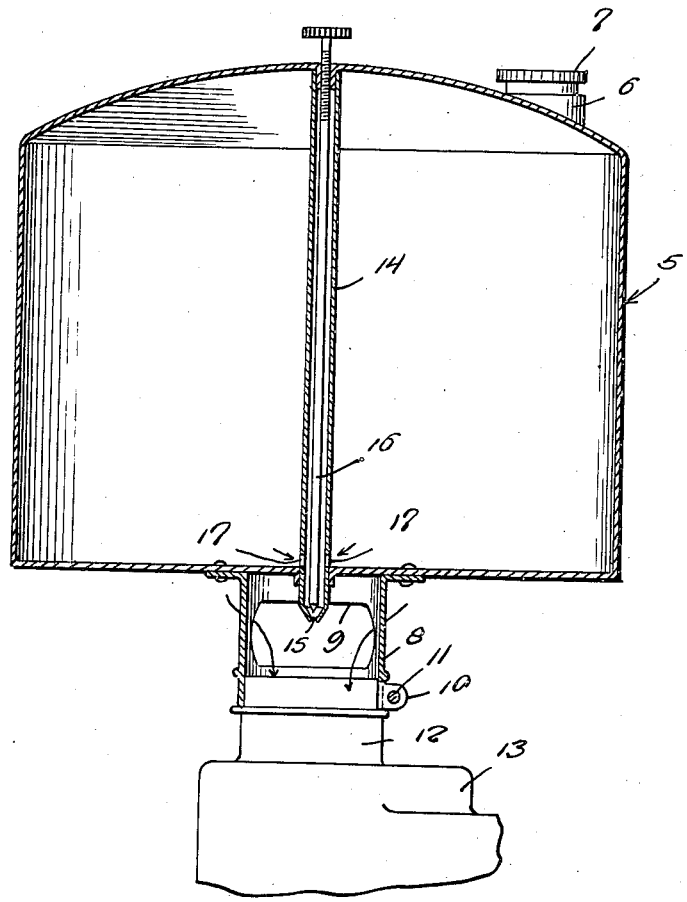
Inventor
Wickliffe H. Pike,
By McMorrow and Berman
Attorneys Patented Nov. 27, 1945

2,389,685

UNITED STATES PATENT OFFICE 2,389,685

EMERGENCY GASOLINE TANK

Wickliffe H. Pike, Warren, Pa.

Application May 2, 1944, Serial No. 533,797

1 Claim. (Cl. 158—46.5)

This invention relates to an emergency gasoline tank especially adapted for providing a reserve supply of gasoline for the operation of the engine of an automobile or similar vehicle, should the usual supply of gasoline of the automobile become exhausted or the fuel system of the engine, such as the fuel pump, become inoperative so that the automobile may be driven a distance sufficient to permit the fuel tank thereof to be replenished with gasoline or have the fuel system repaired at a service station.

The primary object of the invention is the provision of a portable device of the above stated character which will have capacity for enough gasoline for the operation of the automobile under the conditions specified and which will be safe to be kept in an automobile and may be readily adapted to the carbureter of the engine in lieu of the usual air cleaner when need therefor occurs and may be adjusted to regulate the amount of gasoline fed to the carburetor to assure functioning of the engine.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which the figure is a vertical sectional view illustrating an emergency gasoline tank constructed in accordance with my invention and showing the same applied to a fragmentary portion of a carburetor of an automobile.

Referring in detail to the drawing, the numeral 5 indicates a tank provided with a filling neck 6 in the top wall thereof and which is normally closed by a removable closure 7. This arrangement permits the tank to be easily filled with gasoline and it is preferable that the tank have gasoline capacity sufficient for the running of an automobile a distance in order that the automobile may reach a service station should the main fuel system become inoperative from any cause or the fuel tank of said system become empty of gasoline. The closure 7 may be of a type to permit venting of the tank 5 when the latter is in use on the carbureter of an engine or an ordinary closure may be provided and removed from the tank when the latter is adapted to the carbureter so that the fuel therein will become vented to the atmosphere to assure its proper flow to the carbureter.

Secured to and depending from the bottom wall of the tank 5 is an attaching neck 8 provided with an air opening 9. It is preferable that the attaching neck 8 be of the split type provided with ears 10 adjustably connected together by a fastener 11 so that the neck 8 can be easily slipped over and clamped onto the air intake 12 of the carburetor 13 after the usual air cleaner or filter has been removed from the carbureter.

A tube 14 is located in the tank 5 and is secured to the top wall of the tank and extends through the bottom wall being suitably secured to the latter and terminates below the bottom wall within the attaching neck 8 in the form of a valve seat 15. Threaded in the top wall of the tank 5 and extending downwardly in the tube 14 is a needle valve 16 to cooperate with the seat 15 in regulating the flow of gasoline from the tank into the carburetor 13 or for entirely cutting off the flow when desired.

The tube 14 adjacent the bottom wall of the tank 5 is provided with ports 17 so that the gasoline within the tank 5 may flow into the tube.

The tank 5 may be safely kept containing gasoline within an automobile without danger of leakage by having the needle valve engage with the seat 15 and the closure 7 tightly applied to the filling neck 6. Whenever need occurs for a supply of gasoline for the operation of the automobile other than that furnished by the usual fuel system, the air filter (not shown) is removed from the carburetor 13 and the neck 8 is clamped onto the carburetor in place of the air filter. The needle valve is then adjusted relative to the seat 15 to regulate the flow of gasoline from the tank 5 into the carburetor. The gasoline flowing into the carbureter in a regulated amount from the tank 5 will permit normal operation of the engine of the automobile so that the latter may be driven to a service station for repair or replenishing of the fuel system with gasoline.

While I have shown and described the preferred embodiment of my invention, it is to be understood that minor changes in construction, combination and arrangement of parts may be made without departing from the spirit and scope of the invention as claimed.

Having thus described my invention, what I claim is:

A portable emergency gasoline tank for automobiles, comprising a tank, an outlet neck secured to the bottom of said tank, said outlet having an air port in the side wall thereof, and having a split portion adapted to receive and grip a portion of an automobile engine carburetor after the removal of an air filter therefrom, a tube in said tank, said tube extending into said outlet neck and terminating in a seat adjacent said air port, said tube having ports communicating with the interior of said tank, and a needle valve threaded to the tank and extending into the tube to cooperate with said seat for regulating the flow of gasoline from the tank into the carburetor and for cutting off the flow when desired.

WICKLIFFE H. PIKE.